US012533280B2

(12) United States Patent
Patton

(10) Patent No.: US 12,533,280 B2
(45) Date of Patent: Jan. 27, 2026

(54) JOINT MOVEMENT THERAPY AND ASSISTIVE DEVICE SYSTEM AND METHOD

(71) Applicants: THE BOARD OF TRUSTEES OF THE UNIVERSITY OF ILLINOIS, Urbana, IL (US); REHABILITATION INSTITUTE OF CHICAGO, Chicago, IL (US)

(72) Inventor: James Patton, Chicago, IL (US)

(73) Assignees: The Board of Trustees of the University of Illinois, Urbana, IL (US); REHABILITATION INSTITUTE OF CHICAGO, Chicago, IL (US)

( * ) Notice: Subject to any disclaimer, the term of this patent is extended or adjusted under 35 U.S.C. 154(b) by 1013 days.

(21) Appl. No.: 17/619,498

(22) PCT Filed: Jun. 19, 2020

(86) PCT No.: PCT/US2020/038631

§ 371 (c)(1),
(2) Date: Dec. 15, 2021

(87) PCT Pub. No.: WO2020/257579

PCT Pub. Date: Dec. 24, 2020

(65) Prior Publication Data

US 2022/0304883 A1 Sep. 29, 2022

Related U.S. Application Data

(60) Provisional application No. 62/864,280, filed on Jun. 20, 2019.

(51) Int. Cl.

| | |
|---|---|
| ***A61H 1/02*** | (2006.01) |
| ***A63B 21/055*** | (2006.01) |
| ***A63B 21/16*** | (2006.01) |

(52) U.S. Cl.
CPC ....... *A61H 1/0274* (2013.01); *A63B 21/0552* (2013.01); *A63B 21/16* (2013.01);
(Continued)

(58) Field of Classification Search
CPC ................ A61H 1/0237; A61H 1/0274; A61H 2001/0203; A61H 2201/0157;
(Continued)

(56) References Cited

U.S. PATENT DOCUMENTS

| | | | | |
|---|---|---|---|---|
| 5,186,701 A * | 2/1993 | Wilkinson | ....... A63B 21/00065 482/121 |
| 5,647,827 A | 7/1997 | Gutkowski et al. | |

(Continued)

FOREIGN PATENT DOCUMENTS

| | | |
|---|---|---|
| CN | 105919779 B | 3/2018 |
| WO | WO-2007/012139 A1 | 2/2007 |
| WO | WO-2007/030646 A2 | 3/2007 |

OTHER PUBLICATIONS

International Search Report and Written Opnion, for Corresponding International Application No. PCT/US2020/038631 dated Sep. 30, 2020.

(Continued)

*Primary Examiner* — Tu A Vo
*Assistant Examiner* — Kelsey E Baller
(74) *Attorney, Agent, or Firm* — MARSHALL, GERSTEIN & BORUN LLP

(57) ABSTRACT

A joint movement therapy and assistive device system. The system includes a torque profile device having a plurality of connecting components, a longitudinal axis, and a center. Each connecting component of the plurality of connecting components is disposed at a selected distance relative to the center and a selected angle relative to the longitudinal axis. The system also includes at least one segment end and a
(Continued)

plurality of tensioning components removable secured to the plurality of connecting components of the torque profile device and the at least one segment end. The plurality of tensioning components forms an additive torque profile when coupled between the torque profile device and the at least one segment end.

25 Claims, 4 Drawing Sheets

(52) U.S. Cl.
CPC ................ *A61H 2201/1253* (2013.01); *A61H 2201/1616* (2013.01); *A61H 2201/1638* (2013.01)

(58) Field of Classification Search
CPC .... A61H 2201/0192; A61H 2201/1253; A61H 2201/1269; A61H 2201/1616; A61H 2201/1638; A61H 2201/1647; A61H 2201/165; A61H 2201/1666; A61H 2201/1671; A61H 2201/1676; A61H 2201/5053; A61H 2205/06; A61H 2205/10; A63B 21/023; A63B 21/0407; A63B 21/0557; A63B 21/16; A63B 21/4025
See application file for complete search history.

(56) References Cited

U.S. PATENT DOCUMENTS

| | | | | | |
|---|---|---|---|---|---|
| 6,042,523 | A * | 3/2000 | Graham | A63B 22/203 | 482/79 |
| 6,117,097 | A * | 9/2000 | Ruiz | A61F 5/0109 | 602/26 |
| 6,497,641 | B1 * | 12/2002 | Hinds | A63B 21/4013 | 482/121 |
| 7,153,246 | B2 * | 12/2006 | Koscielny | A63B 21/055 | 482/121 |
| 2005/0233879 | A1 * | 10/2005 | Harrington | A63B 21/00185 | 482/148 |
| 2007/0135279 | A1 * | 6/2007 | Purdy | A63B 21/4025 | 482/121 |
| 2019/0343670 | A1 * | 11/2019 | Ruprecht | A61H 1/0274 | |
| 2021/0196555 | A1 * | 7/2021 | Kyung | A61H 1/0285 | |

OTHER PUBLICATIONS

International Preliminary Report on Patentability, corresponding International Application No. PCTUS2020/038631, Dec. 21, 2021.

* cited by examiner

JOINT MOVEMENT THERAPY AND ASSISTIVE DEVICE SYSTEM AND METHOD

CROSS REFERENCE TO RELATED APPLICATIONS

This application is the U.S. National Phase of International Patent Application No. PCT/US20/38631 filed Jun. 19, 2020, which in turn claims the benefit of U.S. Provisional Application No. 62/864,280 filed on Jun. 20, 2019 entitled "ExoNET: A Soft Exoskeletal Network of Elastic, Nonlinear Torque Field Generators for Neurorehabilitation," the entire disclosures of which are hereby incorporated herein by reference in their entireties.

FIELD OF DISCLOSURE

The present disclosure relates generally to assistive tools for regaining motor control during rehabilitation and, more specifically, to a device using multiple torque generating elements providing assistive torques to patients with motor deficits.

BACKGROUND

Simple exoskeletons have been used for several years as assistive and therapeutic tools for regaining motor control during rehabilitation. These devices employ a wide variety of modalities for torque generation at a joint, with each method holding its own unique advantages in human-robot interaction. Passive devices able to control joint torque stiffness using tension elements, moment arm adjustments, or mechanical reconfiguration have the potential to be simple, lightweight, non-intimidating, and inexpensive—all of which are sought-after advantages in the design of robots.

The MARIONET (Moment Arm Adjustment for Remote Induction of Net Effective Torque) is one such device which utilizes cables and moment arm manipulation to effectively generate torque in upper extremity motion. It belongs to a class of devices that use diagonal tension elements to exert torque on a joint. It varies the moment arm to control torque, rather than regulating the tension. It alters the moment arm by shifting the line of action of the tension element (often rotating its attachment along a circular path). This type of design can be useful for actuating an exoskeleton, providing gravity assistance for mobility, assisting the arm during therapy, or simply reducing the metabolic cost of walking. Moment arm adjustments can provide both positive and negative torque by moving to both sides of the joint's center of rotation. By placing spring origins in differing positions relative to the center of rotation, a variety of torque fields are possible that include unstable and even catastrophic phenomena.

A MARIONET can also be an exo-tendon device, shedding the need for a rigid skeleton and instead relying on the underlying structure of the human operator. Such aspects make this design 'soft' and bring with it the advantages of being user-friendly, safe, and low cost. What required is to have such hardware embody the intelligence that was formerly found in the software. In addition, torque deficit profiles are often highly complex. As such, it is not possible for a single tension element to provide any desired torque across the full range of movement.

SUMMARY

In accordance with the principles of the present disclosure, a joint movement therapy and assistive device system comprises a torque profile device having a plurality of connecting components, a longitudinal axis, and a center, and each connecting component of the plurality of connecting components is disposed at a selected distance relative to the center and a selected angle relative to the longitudinal axis. The system also includes at least one segment end; and a plurality of tensioning components removably and selectively secured to the plurality of connecting components of the torque profile device and the at least one segment end. The plurality of tensioning components form an additive torque profile when selectively secured between the torque profile device and the at least one segment end.

In accordance with another aspect of the present disclosure, a torque rendering system for movement therapy comprises a plurality of tensioning components configured to form a torque profile over one or more muscle segments. The plurality of tensioning components are selectively securable across the one or more muscle segments.

In accordance with yet another aspect of the present disclosure, a method of generating an additive torque profile in a joint movement therapy and assistive device system comprises selectively securing a proximal end of a tensioning component of a plurality of tensioning components to a connecting component of a torque profile device and a distal end of the tensioning component to a connecting device of at least one segment end. The method further comprises selectively securing a proximal end of another tensioning component of the plurality of tensioning components to another connecting component of the torque profile device and a distal end of the tensioning component to the connecting device of the at least one segment end, such that the two tensioning components in a parallel and stacked arrangement relative to each other.

Any one or more of the foregoing joint movement therapy and assistive device system, the torque rendering system for movement therapy, or the method of generating an additive torque profile in a joint movement therapy and assistive device system may include any one or more of the following additional features.

In one aspect, each tensioning component of the plurality of tensioning components may include a proximal end and a distal end, and at least one proximal end may include a pin disposed in a connecting component of the plurality of connecting components of the torque profile device.

In another aspect, the plurality of connecting components may include at least one connecting component including a hole, and the pin may be disposed within the hole of the connecting component of the torque profile device.

In yet another aspect, the distal end of the at least one tensioning component may include a pin disposed in a connecting device of the at least one segment end.

In still another aspect, each connecting component of the plurality of connecting components may be disposed at a selected distance relative to the center of the torque profile device in a range from approximately 0.01 m to 0.15 m.

In another aspect, each connecting component of the plurality of connecting components may be disposed at a selected angle relative to the longitudinal axis of the torque profile device of one of less than 90 degrees, 90 degrees or more than 90 degrees.

In yet another aspect, the plurality of tensioning components may be stackable and configured to form at least one of non-linear torque profiles, stable and unstable configurations and bi-stability systems, and a mechanical replacement system for state-dependent control algorithms.

In another aspect, a proximal end of the at least one tensioning component of the plurality of tensioning components may be disposed at a selected angle relative to the longitudinal axis of the torque profile device in a range of approximately less than 90 degrees and the at least one tensioning component is a spring element.

In yet another aspect, the at least one segment end may comprise a first segment end, and at least one tensioning component of the plurality of tensioning components may include a proximal end selectively secured to the torque profile device and a distal end selectively secured to the first segment end. Another tensioning component may include a proximal end selectively secured to the torque profile device and a distal end selectively secured to a second segment end. In addition, yet another tensioning component may include a proximal end selectively secured to the second segment end and a distal end selectively secured to the first segment end.

In another aspect, the first segment end may be configured to be disposed on a wrist. In addition, the second segment end may be configured to be disposed on an elbow, and the torque profile device may be configured to be disposed on a shoulder.

In yet another aspect, the plurality of tensioning components may include a first tensioning component configured to be disposed across the shoulder and the elbow, a second tensioning component configured to be disposed across the elbow and the wrist, and a stack of tensioning components including a pair of tensioning components. The pair of tensioning components may be configured to be disposed across the shoulder and the wrist.

According to yet another aspect, the second segment end may include a plurality of connecting components, a longitudinal axis, and a center. Each connecting component may be disposed at a selected distance relative to the center and a selected angle relative to the longitudinal axis, and at least one connecting component may include a hole.

In another aspect, each connecting component of the plurality of connecting components of the second segment end may be disposed at a selected distance relative to the center of the second segment end in a range from approximately 0.01 m to 0.15 m.

In another aspect, the plurality of tensioning components may be configured to be selectively secured to one or more of a torque profile device, a first segment end, and a second segment end of a joint movement therapy and assistive device system.

In yet another aspect, the at least one tensioning component of the plurality of tensioning components may be configured to be selectively securable across a muscle segment of an elbow and a muscle segment of a wrist.

In another aspect, the plurality of tensioning components may include a first tensioning component configured to be selectively securable across a muscle segment of a shoulder and the muscle segment of the elbow, a second tensioning component configured to be selectively securable across the muscle segment of the elbow and the muscle segment of the wrist, and a stack of tensioning components including one or more of a pair of tensioning components configured to be selectively securable across the muscle segment of the shoulder and the muscle segment of the wrist.

In yet another aspect, the at least one segment end may be a first segment end, and the method may further comprise selectively securing a proximal end of another tensioning component of the plurality of tensioning components to another connecting component of the torque profile device and a distal end of the same tensioning component to a connecting component of a second segment end.

According to another aspect, the at least one segment end is a first segment end, and the method may further comprise selectively securing a proximal end of another tensioning component of the plurality of tensioning components to a connecting component of a second segment end and a distal end of the same tensioning component to the connecting device of the first segment end.

In another aspect, selectively securing a proximal end of a tensioning component of a plurality of tensioning components to a connecting component of a torque profile device and a distal end of the tensioning component to a connecting device of at least one segment end may comprise selectively securing a pin of the proximal end of the tensioning component to a hole of the torque profile device and a pin of the distal end of the tensioning component to the connecting device of the at least one segment end.

In yet another aspect, selectively securing a proximal end of another tensioning component of the plurality of tensioning components to another connecting component of the torque profile device and a distal end of the tensioning component to the connecting device of the at least one segment end may comprise selectively securing a pin of the proximal end of the tensioning component to another hole of the torque profile device and a pin of the distal end of the tensioning component to the connecting device of the at least one segment end.

Various advantages of the present disclosure are specifically described below in reference to the exemplary embodiments, or conceptually embodied therein. The drawings and description herein are provided to merely illustrate examples of the general concepts discussed throughout the present disclosure. Numerous changes and modifications can be made, as known to those of skill in the art, without departing from the general principles set forth herein.

BRIEF DESCRIPTION OF THE DRAWINGS

These and other features and advantages of the various exemplary embodiments disclosed herein will be better understood with respect to the following description and drawings, in which.

DETAILED DESCRIPTION

The detailed description set forth below in connection with the appended drawings is intended as a description of certain exemplary embodiments of various system components constructed in accordance with the principles herein. These examples are not intended to represent the only embodiments or forms that may be developed or utilized according to these principles. It is further understood that the use of relational terms such as first and second, and the like are used solely to distinguish one entity from another without necessarily requiring or implying any actual such relationship or order between such entities.

Generally, a joint movement therapy and assistive device system in accordance with the principles herein may employ an inherent sinusoidal torque profile, whose phase and intensity can be adjusted simply by locating proper attachment points. Because of this flexibility, it is possible to use multiple MARIONETs, each mathematically used as a basis function. By combining the torques of these tension elements in parallel (i.e., stacking MARIONETs), one may approximate any torque function by linear sum of the contribution of elements, much like a finite Fourier series or a radial basis function network. Moreover, the tension elements can eliminate the need for motors and controllers, allowing the hardware to embody the intelligence that was formerly found in the software, as explained more below.

Figure 1:
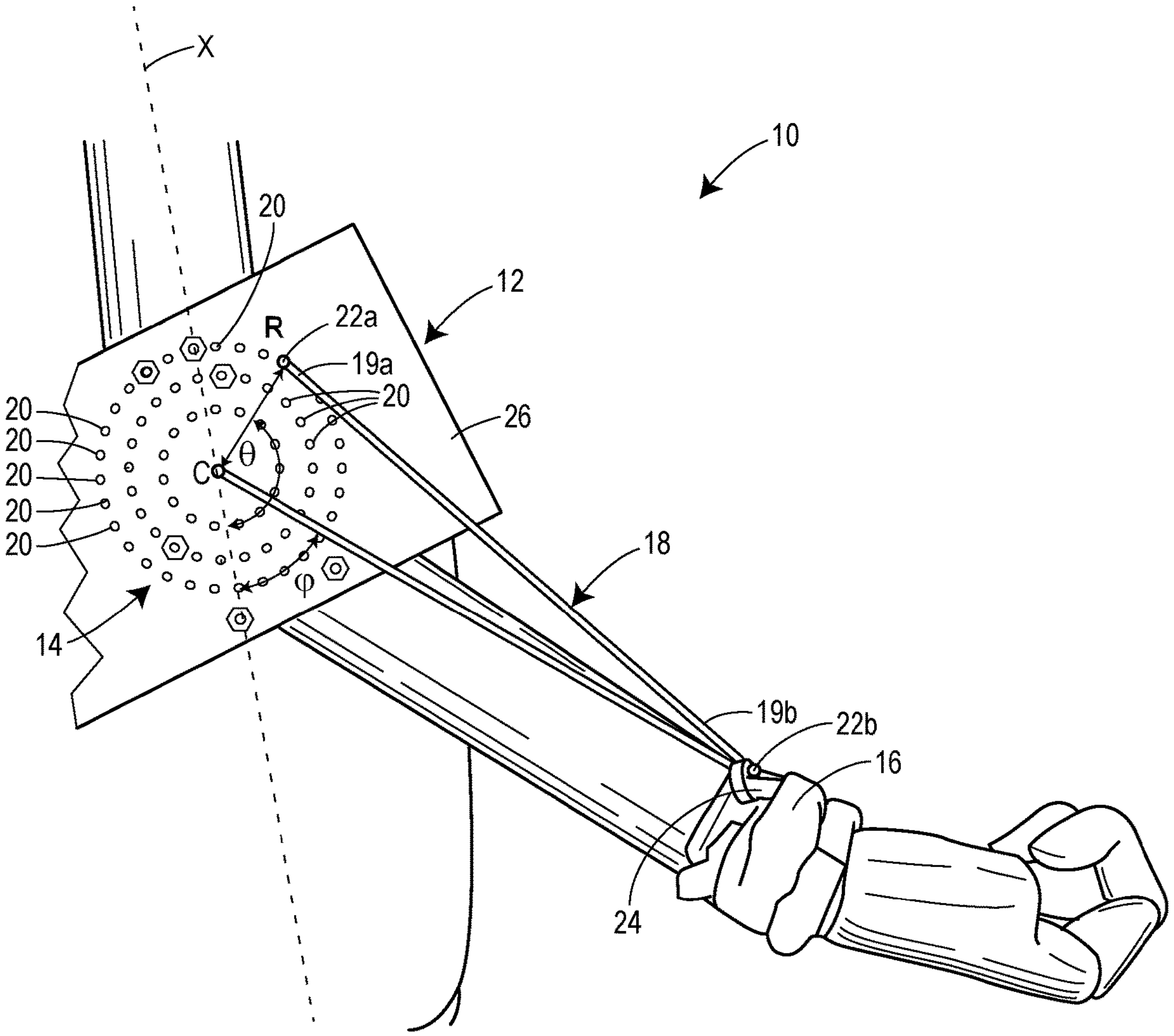
FIG. 1 is a perspective view of a joint movement therapy and assistive device system according to an aspect of the present disclosure.

Referring now to FIG. 1, an exemplary joint movement therapy and assistive device system 10 according to one aspect of the present disclosure is depicted. The system 10 may also be referred to as an ExoNET, which is an Exoskeletal Network for Elastic Torque system. The joint movement therapy and assistive device system 10 can work across multiple joints anywhere on the user, while still being user friendly.

The design of the joint movement therapy and assistive device system 10, e.g., the ExoNET, is driven by the need for a lightweight, simple, customizable device that provides any arbitrarily chosen torque profile to multiple joints. The system 10 is an exo-tendon device that utilizes diagonal tension elements to render torque for specified upper extremity movements, in one example, as explained more below.

In its simplest prototype form of FIG. 1, the ExoNET consists of adjustable pins positioned some distance from a proximal end of an arm segment (joint-to-joint). Each pin is fixed on one end of a diagonal tensioning element, such as a spring element, which is capable of stretching when the distance between pins changes. The location of the pin is specified by its radius and angle in relation to the center of rotation of the joint proximal to the segment it acts upon. A change in the tensioning element's radius or angle leads to a change in the corresponding joint's moment arm, leading to torque production.

More specifically, and as depicted in FIG. 1, the joint movement therapy and assistive device system 10 includes a torque profile device 12 having a plurality of connecting components 14 disposed at a selected distance and a selected angle from a center C of the torque profile device 12. The center C of the torque profile device 12 may correspond to a center of rotation of a joint on which the torque profile device 12 is disposed, such as an elbow joint or a shoulder joint, as explained more below. The system 10 further includes at least one segment end 16 and a torque rendering system having at least one tensioning component 18. The at least one tensioning component 18 is selectively and removably secured to a connecting component 20 of the torque profile device 12 and the at least one segment end 16. So configured, the at least one tensioning component 18 forms a torque profile, such as an additive torque profile, when secured between and across the torque profile device 12 and the at least one segment end 16.

The at least one tensioning component 18 and any additional tensioning component that may be added to the joint movement therapy and assistive device system 10 includes a proximal end 19*a* and a distal end 19*b*. In one example, the proximal end 19*a* of the tensioning component 18 includes a pin 22*a* and the distal end 19*b* of the tensioning component 18 also includes a pin 22*b*. When the at least one tensioning component 18 is selectively secured to the torque profile device 12, the pin 22*a* of the tensioning component 18 is disposed in one of the connecting components 20 of the plurality of connecting components 14 of the torque profile device 12. In one example, and as depicted in FIG. 1, the connecting component 20 may be a hole or an aperture that receives the pin 22*a* of the proximal end 19*a* of the tensioning component 18. In this example, the pin 22*a* is disposed a distance R from the center of the torque profile device 12, such as the center of rotation. As will be appreciated, the pin 22*a* may be easily removed from one of the connecting components 20 and to another connecting component 20 depending upon the torque desired for a user of the joint movement therapy and assistive device system 10. In a similar manner, the pin 22*b* of the distal end 19*b* of the tensioning component 18 may be disposed in and/or coupled to a connecting device 24 of the segment end 16. In this example, the segment end 16 is configured to be disposed on a wrist of a user, such as on a wrist joint or on or near a muscle segment of the user's wrist. In addition, the torque profile device 12 is configured to be disposed on an elbow of the user, such as on an elbow joint or on or near a muscle segment of the user's elbow. Because the tensioning component 18 is selectively secured to each of the torque profile device 18 and the segment end 16, the tensioning component 18 is selectively securable between and across the elbow or a muscle segment of the elbow and the wrist or a muscle segment of the wrist in this example.

As will be appreciated the connecting device 24 may be any connecting device known to secure parts together. For example, the connecting device 24 may include a hole or an aperture into which the pin 22*b* of the distal end 19*b* of the tensioning component 18 is disposed. Alternatively, the connecting device 24 may be another fixture that receives the pin 22*b* or another component of the distal end 19*b* of the tensioning component 18. In addition, the connecting device 24 may include any other fastener capable of securing the distal end 19*b* of the tensioning component 18 to the segment end 16.

In addition, and still referring to FIG. 1, the torque profile device 12 includes a body 26 in which the plurality of connecting components 14 and the center C is disposed. In one example, the plurality of connecting components 14 may be disposed around the center C of the torque profile device 12, forming a pattern of rings of the connecting components 14, as depicted in FIG. 1. The connecting components 20 may be disposed equidistantly from each other and around the C of the torque profile device 12. Alternatively, the connecting components 20 may form any other type of pattern in the body 26 of the torque profile device 12 or be randomly disposed in the body 26 of the torque profile device 12 not according to any pattern and still fall within the scope of the present disclosure. In addition, each connecting component 20 of the plurality of connecting components 14 is disposed a selected distance, such as R, from the center C of the torque profile device 12 in a range from approximately 0.01 m to 0.15 m.

Further, the body 26 of the torque profile device 12 further includes a longitudinal axis X. Each connecting component 20 of the torque profile device 12 is disposed at a selected angle relative to the longitudinal axis X of the torque profile device 12 of one of less than 90 degrees, 90 degrees, or more than 90 degrees. In addition, the pin 22*a* of the proximal end 19*a* of the tensioning component 18 is disposed at an angle theta relative to and/or from the longitudinal axis X of the torque profile device 12. This angle of the pin 22*a* relative to the longitudinal axis may be less than 90 degrees, 90 degrees, or more than 90 degrees, depending upon the connecting component 20 in which the pin 22*a* of the tensioning component 18 is disposed, for example.

Still further, the at least one tensioning component 18 and any other additional tensioning components that may be added to the system 10, such as in a parallel or a stacked arrangement with the at least one tensioning component 18, may be a spring element. Such a spring element has an elasticity that enables a body of the tensioning component 18 to be stretched and/or releasably moved to various connecting components 20 on the torque profile device 12, for example. This enables the system 10 to be flexibly adapted to a size and shape of a user, such that the needed torque profile for the user may be generated. In the example of FIG. 1, the tensioning component 18 may be an arm link, and Phi is the angle of the arm link, e.g., the tensioning component, is disposed relative to the longitudinal axis X. It will be appreciated that the at least one tensioning component 18 (and any other additional tensioning component 18) may alternatively take the form of any other element and/or be comprised of one or more materials having an elasticity that allows the tensioning component 18 to function as described above and still fall within the scope of the present disclosure.

The body 26 is generally rectangular in shape but may alternatively take the form of one or more various other shapes, such as a circle, a semi-circle, square, or triangle. In one example, the body 26 of the torque profile device 12 is a board that positions each pin. Alternatively, the body 26 of the torque profile device 12 may include many other forms, shapes, and sizes different from a board and still fall within the scope of the present disclosure.

In accordance with the principles herein, the aim of this joint movement therapy and assistive device system 10, e.g., the ExoNET system, is to generate a desired, task-specific torque profile for any user. Torque for the tensioning component 18, such as the spring element, is a product of the moment arm and force of the at least one tensioning component 18. The moment arm of each tensioning component 18 is a function of the location of the pin 22*a* of the tensioning component 18 on the body 26 of the torque profile device 12 and the angle of the tensioning component 18 relative to the longitudinal axis X. Here, a spring force of the tensioning component 18 is most simply governed by Hooke's Law, but this may be expanded to allow for nonlinear stiffness model or shift in resting length.

Using combinations of or "stacks" of the tensioning elements 18, this forms network of parallel torque-producing elements, and hence this is referred to as ExoNET, which capitalizes on their behavior as basis functions. This results in a sum of all torque profiles from each element, providing any unique output, personalized for the user.

Figure 2:
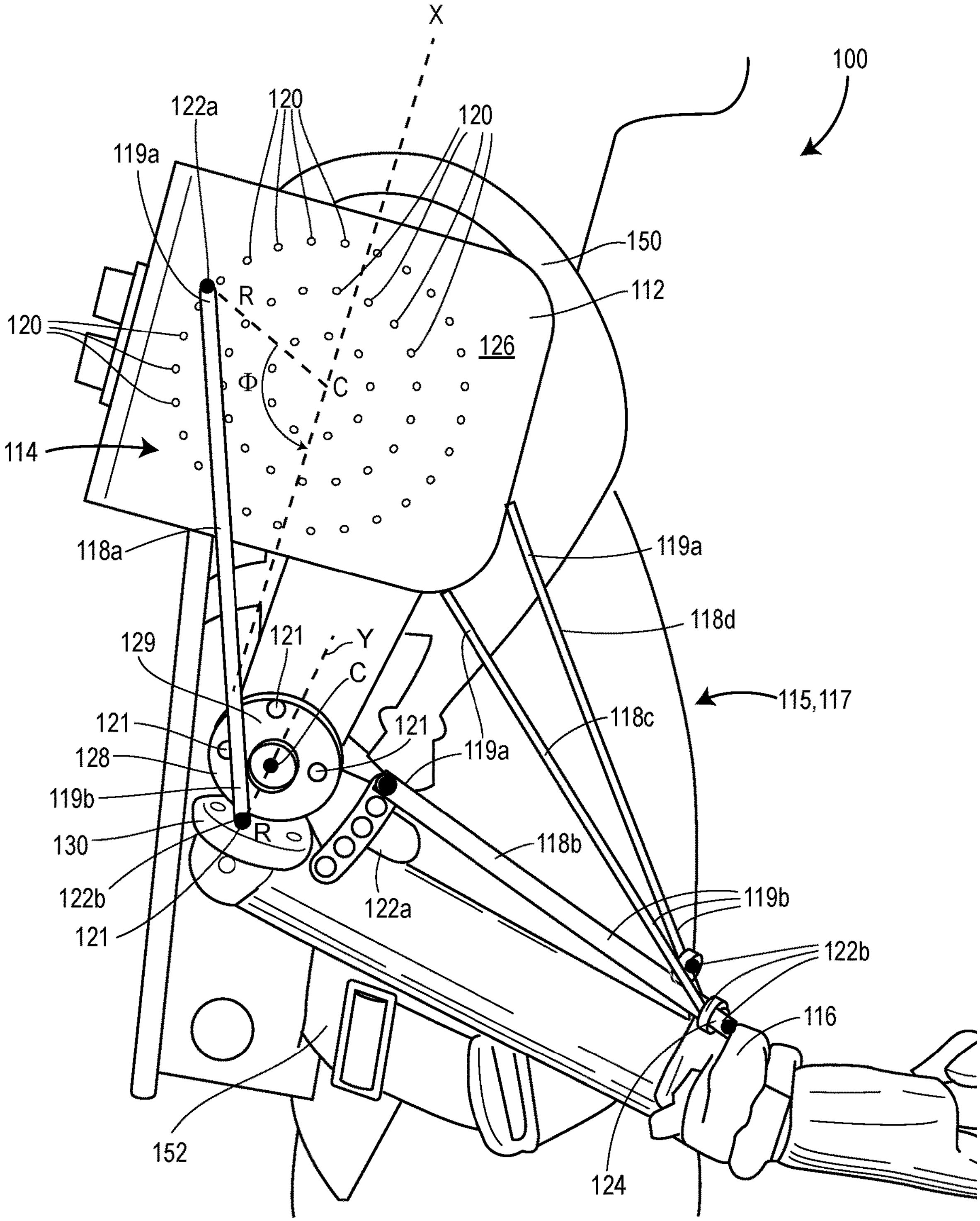
FIG. 2 is a perspective view of another joint movement therapy and assistive device system according to another aspect of the present disclosure.

More specifically, and referring now to FIG. 2, another joint movement therapy and assistive device system 100 is depicted, which may be referred to as a Multi-ExoNET system. The joint movement therapy and assistive device system 100 is similar to the joint movement therapy and assistive device system 10 of FIG. 1, with some additions. For example, the joint movement therapy and assistive device system 100 of FIG. 2 includes a torque rendering system 115 having a plurality of tensioning components 117. The system 100 also includes a second segment end 128, as explained more below. Parts of the joint movement therapy and assistive device system 100 of FIG. 2 that are the same as or similar to parts of the joint movement therapy and assistive device system 10 of FIG. 1 have reference numbers 100 more than the references numbers in FIG. 1, for example.

As depicted in FIG. 2, the joint movement therapy and assistive device system 100 includes a torque profile device 112 having a plurality of connecting components 114 disposed at a selected distance and a selected angle from a center C of the torque profile device 112. The center C of the torque profile device 112 may correspond to a center of rotation of a joint on which the torque profile device 12 is disposed, such as an elbow joint or a shoulder joint, as explained more below. The system 100 further includes at least one segment end 116 and the plurality of tensioning components 117. The plurality of tensioning components 117 are stackable and configured to form non-linear torque profiles, stable and unstable configurations, and bi-stability systems, and a mechanical replacement system for state-dependent control algorithms. In addition, the at least one segment end 116 is a first segment end 116, and the system 100 also includes a second segment end 128. In this example, the first segment end 116 is disposed on a wrist or a muscle segment of the wrist of the user, and the second segment end 128 is disposed on an elbow or a muscle segment of the elbow of the user, as depicted in FIG. 2. In addition, the torque profile device 112 is disposed on a shoulder or a muscle segment of the shoulder, as also depicted in FIG. 2. While such parts of the system 100 are disposed on various upper extremity areas of the human body, the system 100 may alternatively and/or additionally be used with other areas of the human body, such as lower extremity areas and joints, including a knee and ankle, for example.

Each tensioning component of the plurality of tensioning components 117 is selectively and removably secured to a connecting component 120 of the torque profile device 112 and one of the first segment end 116 and the second segment end 128 or to the first segment 116 and the second segment 128, as explained more below. So configured, the plurality of tensioning components 117 forms a torque profile, such as an additive torque profile. Specifically, the torque profile is generated when the plurality of tensioning components 117 are secured between and across the torque profile device 112 and one of the first segment end 116 and the second segment end 128 or between the first segment end 116 and the second segment end 128.

In this example, the plurality of tensioning components 117 includes a first tensioning component 118*a* disposed across the shoulder or a muscle segment of the shoulder and the elbow or a muscle segment of the elbow. A second tensioning component 118*b* is disposed across the elbow or the muscle segment of the elbow and the wrist or the muscle segment of the wrist. The plurality of tensioning components 117 also includes a stack of tensioning components including a pair of tensioning components 118*c*, 118*d*. The pair of tensioning components 118*c*, 118*d* are disposed across the shoulder or the muscle segment of the shoulder and the wrist or the muscle segment of the wrist.

Each tensioning component 118*a*, 118*b*, 118*c*, 118*d* includes a proximal end 119*a* and a distal end 119*b*. In one example, the proximal end 119*a* includes a pin 122*a* and the distal end 119*b* also includes a pin 22*b*. When the first tensioning component 118*a* is selectively secured to the torque profile device 112, the pin 122*a* of the tensioning component 118 is disposed in one of the connecting components 120 of the plurality of connecting components 114 of the torque profile device 112. In one example, and as depicted in FIG. 2, the connecting component 120 may be a hole or an aperture that receives the pin 122*a* of the proximal end 119*a* of the tensioning component 118*a*. In this example, the pin 122*a* is disposed a distance R from the center C of the torque profile device 112, such as the center of rotation of the joint. As will be appreciated, the pin 122*a* may be easily removed from one of the connecting components 120 and to another connecting component 120 depending upon the torque desired for a user of the joint movement therapy and assistive device system 100. In a similar manner, the pin 122*b* of the distal end 119*b* of the tensioning component 118*a* may be disposed in and/or coupled to a connecting device 130 of the second segment end 128. Because the tensioning component 118*a* is selectively secured to each of the torque profile device 112 and the second segment end 128, the tensioning component 118*a* is selectively securable between and across the shoulder or the muscle segment of the shoulder and the elbow or a muscle segment of the elbow in this example.

When the second tensioning component 118*b* is selectively secured to the second segment end 128, the pin 122*a* of the tensioning component 118*b* is disposed in a connecting component 121 of the second segment end 128. More specifically, and like the torque profile device 112, the second segment end 128 may also include a plurality of connecting components 121. The connecting component 121 may be a hole or an aperture that receives the pin 122*a* of the second tensioning component 118*b*. As will be appreciated, the pin 122*a* may be easily removed from one of the connecting components 121 and to another connecting component 121 depending upon the torque desired for a user of the joint movement therapy and assistive device system 100. In a similar manner, the pin 122*b* of the distal end 119*b* of the tensioning component 118*b* may be disposed in and/or coupled to a connecting device 124 of the first segment end 116. Because the tensioning component 118*b* is selectively secured to each of the second segment end 128 and the first segment end 116, the tensioning component 118*b* is selectively securable between and across the elbow or a muscle segment of the elbow and the wrist or the muscle segment of the wrist in this example.

Still referring to FIG. 2, when the stack of tensioning components, such as the pair of tensioning components 118*c*, 118*d*, is selectively secured to the torque profile device 112, the pins 122*a* (not shown) of the tensioning components 118*c*, 118*d* are disposed in one of the connecting components 120 of the plurality of connecting components 114 of the torque profile device 112. As will be appreciated, the pins 122*a* may be easily removed from one of the connecting components 120 and to another connecting component 120 depending upon the torque desired for a user of the joint movement therapy and assistive device system 100. In a similar manner, the pin 122*b* of the distal ends 119*b* of the tensioning components 118*c*, 118*d* may be disposed in and/or coupled to the connecting device 124 of the first segment end 116. Because the tensioning components 118*c*, 118*d* are selectively secured to each of the torque profile device 112 and the first segment end 116, the stacked pair of tensioning components 118*c*, 118*d* are selectively securable between and across the shoulder or the muscle segment of the shoulder and the wrist or a muscle segment of the wrist in this example.

As will be appreciated the connecting device 124 may be any connecting device known to secure parts together. For example, the connecting device 124 may include a hole or an aperture into which the pin 122*b* of the distal end 119*b* of the tensioning component 118*b*, 118*c*, 118*d* is disposed. Alternatively, the connecting device 124 may be another member that receives the pin 122*b* or another component of the distal end 119*b* of the tensioning component 118. The connecting device 124 may include any other type of fastener capable of securing the distal end 119*b* of the tensioning component 118*b*, 118*c*, 118*d* to the first segment end 116.

In addition, and still referring to FIG. 2, the body 126 of the torque profile device 112 includes the plurality of connecting components 114 and the center C. In one example, the plurality of connecting components 114 may be disposed around the center C of the torque profile device 112, forming a pattern of rings of the connecting components 114, as depicted in FIG. 1. The connecting components 120 may be disposed equidistantly from each other and around the center C of the torque profile device 112. Alternatively, the connecting components 120 may form any other type of pattern in the body 126 of the torque profile device 112 or be randomly disposed in the body 126 of the torque profile device 112 without any pattern and still fall within the scope of the present disclosure. In addition, each connecting component 120 of the plurality of connecting components 114 is disposed a selected distance, such as R, from the center C of the torque profile device 112 in a range from approximately 0.01 m to 0.15 m.

Further, the body 126 of the torque profile device 12 also includes a longitudinal axis X. Each connecting component 120 of the torque profile device 12 is disposed at a selected angle relative to the longitudinal axis X of the torque profile device 112 of one of less than 90 degrees, 90 degrees, or greater than 90 degrees. In addition, the pin 122*a* of the proximal ends 119*a* of the tensioning components 118*a*, 118*c*, 118*d* is disposed at an angle theta relative to and/or from the longitudinal axis X of the torque profile device 112. This angle of the pin 122*a* relative to the longitudinal axis may be less than 90 degrees, 90 degrees, or more than 90 degrees, depending upon the connecting component 120 in which the pin 122*a* of the tensioning component 18 is disposed, for example. In addition, the body 126 is generally rectangular in shape, but may alternatively take the form of one or more various other shapes, such as a circle, a semi-circle, square, or triangle and still fall within the scope of the present disclosure. In one example, the body 126 of the torque profile device 112 is a board, but may include any other different form and still fall within the scope of the present disclosure.

Still further, each tensioning component 118*a*, 118*b*, 118*c*, 118*d* of the plurality of tensioning components 117 may be a spring element. The spring element has an elasticity that enables a body of the tensioning component 118*a*, 118*b*, 118*c*, 118*d* to be stretched and/or releasably moved to various connecting components 120 on the torque profile device 112, for example. This enables the system 100 to be flexibly adapted to a size and shape of a user, such that the needed torque profile for the user may be generated. It will be appreciated that the tensioning component 118*a*, 118*b*, 118*c*, 118*d* may alternatively take the form of another element different from the spring element, for example, and/or be comprised of one or more materials having an elasticity that allows the tensioning component 118*a*, 118*b*, 118*c*, 118*d* to function as described above and still fall within the scope of the present disclosure.

Referring to the second segment 128, the second segment end 128 may include a body 129 having the connecting components 121 disposed around and in the body 129. In one example, and similar to the connecting components 114 of the torque profile device 112, the plurality of connecting components 121 of the second segment end 128 may be disposed around the center C of the second segment end 128, forming a ring of connecting components 121. The connecting components 121 may be disposed equidistantly from each other and around the center C of the second segment end 128. Alternatively, the connecting components 121 may be disposed in the body 129 of the second segment end 128 in any other manner and still fall within the scope of the present disclosure. In addition, each connecting component 121 may be disposed a selected distance, such as R, from the center C of the second segment end 128 in a range of approximately 0.01 m to 0.15 m.

Further, the body 129 of the second segment end also includes a longitudinal axis Y, and each connecting component 121 of the second segment end 128 is disposed at a selected angle of one of less than 90 degrees, 90 degrees, or more than 90 degrees relative to the longitudinal axis Y of the second segment end 128. In addition, the pin 122*a* of the tensioning component 118*b* may be disposed at an angle relative to the longitudinal axis Y, such as at an angle of less than 90 degrees. This angle depends upon the location of the connecting component 121 in which the pin 122*a* or other end of the tensioning component 118*b* is disposed, for example. In this example, the body 129 is generally circular in shape, but alternatively may take the form of various other shapes, in whole or in part, and still fall within the scope of the present disclosure.

The system 100 may also include a first strap 150 to which the torque profile device 112 may be attached. The first strap 150 may be attached to a patient for use of the system 100, for example. In one example, and as depicted in FIG. 2, the first strap 150 is removably secured to a shoulder of a patient. The system 100 may also include a second strap 152 that is adapted to be disposed around a waist of a patient user in the example of FIG. 2. The second strap 152 is coupled to the first strap 150 and may provide further support to another component of the system 100, such as the second segment end 128.

Figure 3:
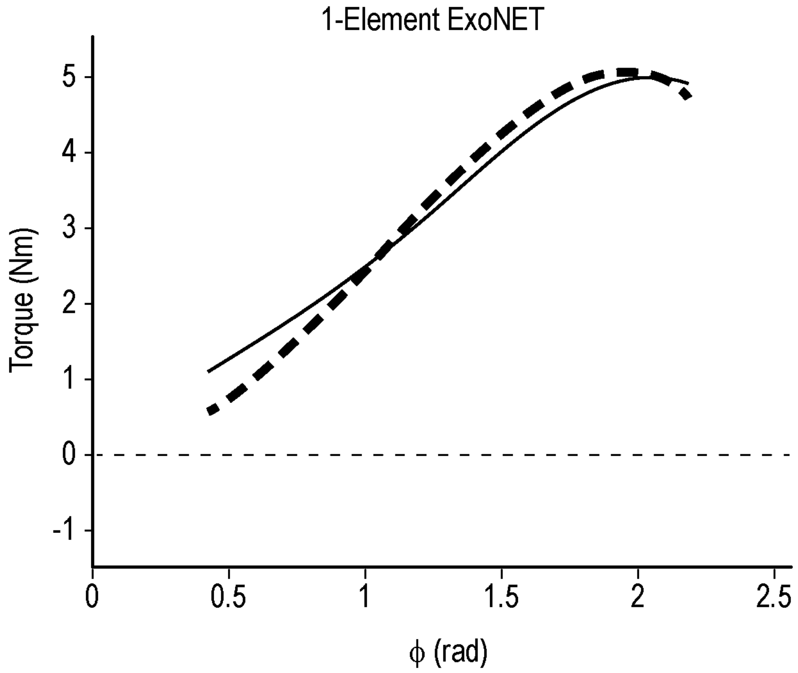
FIG. 3 is a graph depicting results of a desired torque profile and an actual torque profile generated by the joint movement therapy and assistive device system of FIG. 1.
Figure 4:
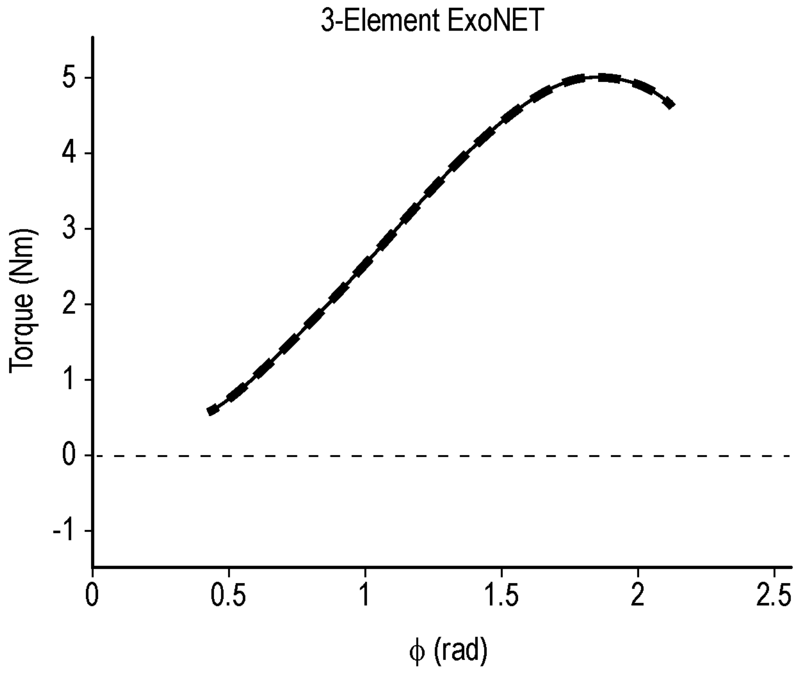
FIG. 4 is a graph depicting results of a desired torque profile and an actual torque profile generated by the joint movement therapy and assistive device system of FIG. 2.

Referring now to FIGS. 3 and 4, the joint movement therapy and assistive device systems 10, 100 was tested to determine if the system 10, 100 can approximate a desired torque profile. For this example, a profile that substitutes the torque equivalent to that of the brachioradialis muscle was chosen, assuming that tension in that muscle is constant. The orthotic goal is to make up for deficits associated with a paretic muscle. The ability of the joint movement therapy and assistive device system, e.g., the ExoNET, to match this desired torque profile was tested, approximated by our single or multiple "stacked" configuration, as depicted in FIGS. 3 and 4, respectively.

Simple function minimization can be used to determine the optimal spring anchor positions. Since it is not realistic to anchor the tensioning component, such as a spring element, at a very large or very small radius, the selected range of possible radii values was constrained between 0.01 m and 0.15 m for the exemplary embodiments, as explained more above. Other ranges may provide suitable solutions as well in accordance with the principles herein. This global optimization process aims to minimize the cost given by the summed squared errors between the desired profile and the one calculated through the ExoNET system. Further regularization terms can be added to the cost function to limit or constrain other factors that serve other needs.

Specifically, the optimization results of FIG. 3 depict the joint movement therapy and assistive device system 10 using one tensioning component 18. The desired torque profile generated by the optimization is represented in a solid line, and the actual torque profile generated by the tensioning component 18 is represented in a dashed line. The average error between the desired torque profile and the actual torque profile generated by the single tensioning component 18, for example, was 0.24577 Nm, with a variance of 0.019887.

Referring now to FIG. 4, the optimization results of the joint movement therapy and assistive device system 100 using multiple, such as three, tensioning components 118, for example, is depicted. Again, the desired torque profile generated by the optimization is represented in a solid line, and the actual torque profile generated by the tensioning component 18 is represented in a dashed line. In this example, the average error between the desired torque profile and the actual torque profile generated by the multiple tensioning components 118 is 0.08936 m with a variance of 0.00391, which is much less than the single tensioning component results depicted in FIG. 3, for example.

Figure 5:
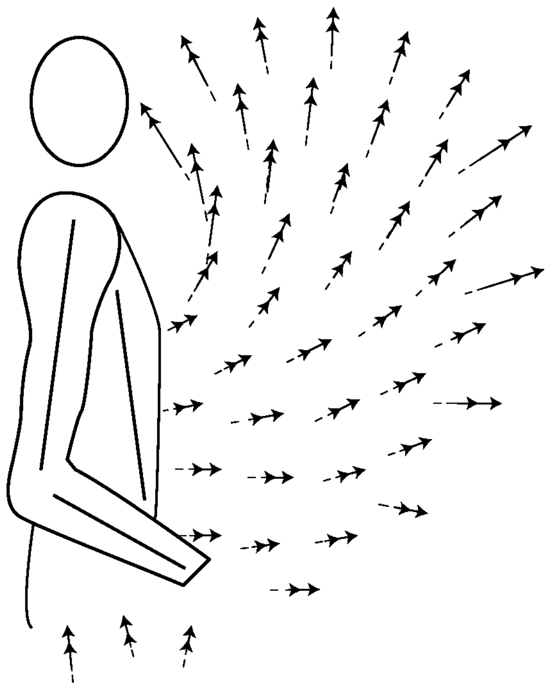
FIG. 5 is a perspective view of a gravity compensation field generated by the joint movement therapy and assistive device system of FIG. 2 compared to gravitational demand.

Referring now to FIG. 5, the ability of the joint movement therapy and assistive device system 100 to cancel gravity was tested in a multi-joint application, using the tensioning components 118*a*, 118*b*, 118*c*, 118*d*, such as elastic elements, that cross the shoulder, elbow, wrist, and both shoulder and elbow. Using an anthropomorphic model of body segment parameters of geometry and mass distribution of a 50th percentile male, the optimization was broadened to fit all parameters of all tensioning components crossing all joints to minimize the mean square error of torque at a set of positions in the workspace.

The capability of the joint movement therapy and assistive device system 100 for generating a gravity compensation is depicted as a vector field in FIG. 5. In particular, a four-dimensional display of the effect of the system's compensation at various workspace positions is depicted. The field generated by the joint movement therapy and assistive device system 100 is depicted in a dashed line arrow format and almost perfectly matches the actual gravitational demand, which is depicted in a solid line arrow format. This is illustrated by the essentially overlapping arrows of the actual gravitational demand and the gravitational field generated by the system 100. Thus, the joint movement therapy and assistive device system 100 is able to provide excellent and highly accurate compensation for the weight of a user's arm, for example.

While the joint movement therapy and assistive device system 10, 100 is depicted in the figures on a user's arm, it will be understood that the joint movement therapy and assistive device system 10, 100 may alternatively be used on another joint system, such as a user's knee and ankle and still fall within the scope of the present disclosure.

Moreover, and at least in view of the foregoing, it will also be understood that the joint movement therapy and assistive device 100 may generate a torque profile according to the following exemplary method. More specifically, a method of generating a torque profile, such as an additive torque profile, in the joint movement therapy and assistive device 100 comprises selectively securing the proximal end 19*a*, 119*a* of at least one tensioning component 18, 118*a*, 118*c*, 118*d* to the connecting component 20, 120 of the torque profile device 12, 112.

The method also includes selectively securing the distal end 19*b*, 119*b* of the at least one tensioning component 18, 118*c*, 118*d* to the connecting device 24, 124 of the segment ends 16, 116. The method also includes selectively securing a proximal end 119*a* of another tensioning component 118*c*, 118*d* of the plurality of tensioning components 117 to another connecting component 120 of the torque profile device 112 and the distal end 119*b* of the tensioning component 118*c*, 118*d* to the connecting device 124 of the at least one segment end 16, 116. In this way, the two tensioning components 118*c*, 118*d* are in a parallel and stacked arrangement relative to each other.

In addition, when the at least one segment end is the first segment end 116, the method may also comprise selectively securing the proximal end 119*a* of another tensioning component 118*a* of the plurality of tensioning components 117 to another connecting component 120 of the torque profile device 112 and a distal end 119*b* of the same tensioning component 118*a* to the connecting component 121 of the second segment end 128.

Further, when the at least one segment end 116 is the first segment end 116, the method comprises selectively securing the proximal end 119*a* of another tensioning component 118*b* of the plurality of tensioning components 117 to the connecting component 121 of the second segment end 128 and the distal end 119*b* of the same tensioning component 118*b* to the connecting device 124 of the first segment end 116.

In view of the foregoing, several advantages of the systems and method of the present disclosure will be understood. The joint movement therapy and assistive device system 10, 100, e.g., the ExoNET, has successfully demonstrated its ability to provide torques for gravity compensation and error augmentation applications. The system 10, 100 can provide effective compensation for deficits in upper extremity movement and also has the potential to be easy to use for both clinician and patient, leading to a greater chance for clinical acceptance. The system's adjustable tensioning components 18, 118*a*, 118*b*, 118*c*, and 118*d*, e.g., spring elements, eliminate the need for motors and controllers, which makes the device user-friendly, safe, non-intimidating, and low-cost. The system 10, 100 also can fit into a large variety of anthropometric dimensions so as to be easily used on a greater number of people.

The expansion of the original MARIONET concept to a combination of diagonal tensioning components 118*a*, 118*b*, 118*c*, 118*d* sheds light on new capabilities for a simple design. The system 10, 100 now represents a simple customizable tool capable of providing assistive torques to patients with motor deficits. The motivation behind this device is to allow therapists to easily assemble and adjust the ExoNET system 10, 100 depending on an individual patient's unique motor deficits.

Additionally, designs constructed in accordance with the principles herein aim to fit into a large variety of anthropometric dimensions to be easily used on a greater number of people. This exotendon network of "stacked" tensioning components 118*a*, 118*b*, 118*c*, 118*d* has the potential to be used for the actuation of several joints, can deliver non-linear torque fields, allow for stable and unstable configurations and bi-stability, and can even mechanically replace some state-dependent control algorithms. This represents a shift of the intelligent aspects of control from the software programs to the physical hardware, which may be a sleek, economical solution for actuator designs that advance human neurorehabilitation technology.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Variations of the specific device configurations shown and described herein are within the scope of the principles of the present disclosure, and are included in all claims deriving therefrom.

What is claimed:

1. A joint movement therapy and assistive device system comprising:

a torque profile device having a plurality of connecting components, a longitudinal axis, and a center, each connecting component of the plurality of connecting components disposed at a selected distance relative to the center and a selected angle relative to the longitudinal axis, the plurality of connecting components disposed around the center of the torque profile device, forming a pattern of rings of the connecting components;

at least one segment end; and a plurality of tensioning components removably and selectively secured to the plurality of connecting components of the torque profile device and the at least one segment end, wherein at least one tensioning component of the plurality of tensioning components includes a proximal end having a pin disposed in a connecting component of the plurality of components;

the plurality of tensioning components forming an additive torque profile when selectively secured between the torque profile device and the at least one segment end.

2. The system of claim 1, wherein each tensioning component of the plurality of tensioning components includes a distal end.

3. The system of claim 2, wherein the plurality of connecting components includes at least one connecting component including a hole, the pin disposed within the hole of the connecting component of the torque profile device.

4. The system of claim 2, wherein the distal end of at least one tensioning component includes a pin disposed in a connecting device of the at least one segment end.

5. The system of claim 1, wherein each connecting component of the plurality of connecting components is disposed at a selected distance relative to the center of the torque profile device in a range from approximately 0.01 m to 0.15 m.

6. The system of claim 1, wherein each connecting component of the plurality of connecting components is disposed at a selected angle relative to the longitudinal axis of the torque profile device of one of less than 90 degrees, 90 degrees or more than 90 degrees.

7. The system of claim 1, wherein the plurality of tensioning components are stackable and configured to form at least one of non-linear torque profiles and stable and unstable configurations and bi-stability.

8. The system of claim 1, wherein a proximal end of at least one tensioning component of the plurality of tensioning components is disposed at a selected angle relative to the longitudinal axis of the torque profile device in a range of approximately less than 90 degrees and the at least one tensioning component is a spring element.

9. The system of claim 1, wherein the at least one segment end comprises a first segment end, and at least one tensioning component of the plurality of tensioning components includes a proximal end selectively secured to the torque profile device and a distal end selectively secured to the first segment end, another tensioning component of the plurality of tensioning components includes a proximal end selectively secured to the torque profile device and a distal end selectively secured to a second segment end, and another tensioning component includes a proximal end selectively secured to the second segment end and a distal end selectively secured to the first segment end.

10. The system of claim 9, wherein the first segment end is configured to be disposed on a wrist, the second segment end is configured to be disposed on an elbow, and the torque profile device is configured to be disposed on a shoulder.

11. The system of claim 9, wherein the second segment end includes a plurality of connecting components, a longitudinal axis, and a center, each connecting component disposed at a selected distance relative to the center and a selected angle relative to the longitudinal axis, and at least one connecting component including a hole.

12. The system of claim 11, wherein each connecting component of the plurality of connecting components of the second segment end is disposed at a selected distance relative to the center of the second segment end in a range from approximately 0.01 m to 0.15 m.

13. The system of claim 1, wherein the plurality of tensioning components includes a first tensioning component configured to be disposed across the shoulder and the elbow, a second tensioning component configured to be disposed across the elbow and the wrist, and a stack of tensioning components including a pair of tensioning components, the pair of tensioning components configured to be disposed across the shoulder and the wrist.

14. A torque rendering system for movement therapy comprising:

a torque profile device having a plurality of connecting components, the plurality of connecting components disposed around a center of the torque profile device, forming a pattern of rings of the connecting components; and a plurality of tensioning components configured to form a torque profile over one or more muscle segments, the plurality of tensioning components selectively securable across the one or more muscle segments.

15. The torque rendering system of claim 14, wherein the plurality of tensioning components are configured to be selectively secured to one or more of the torque profile device, a first segment end, and a second segment end of a joint movement therapy and assistive device system.

16. The torque rendering system of claim 14, wherein at least one tensioning component of the plurality of tensioning components is configured to be selectively securable across a muscle segment of an elbow and a muscle segment of a wrist.

17. The torque rendering system of claim 14, wherein the plurality of tensioning components includes a first tensioning component configured to be selectively securable across a muscle segment of a shoulder and the muscle segment of the elbow, a second tensioning component configured to be selectively securable across the muscle segment of the elbow and the muscle segment of the wrist, and a stack of tensioning components including one or more of a pair of tensioning components configured to be selectively securable across the muscle segment of the shoulder and the muscle segment of the wrist.

18. The torque rendering system of claim 14, wherein the plurality of tensioning components are stackable and configured to form at least one of non-linear torque profiles and stable and unstable configurations and bi-stability systems.

19. The torque rendering system of claim 14, wherein each tensioning component of the plurality of tensioning components includes a proximal end and a distal end, and at least one proximal end includes a pin disposed in a connecting component of the plurality of connecting components of the torque profile device.

20. The torque rendering system of claim 19, wherein the distal end of at least one tensioning component includes a pin disposed in one of a connecting device of a first segment end or a connecting component of a second segment end.

21. A method of generating an additive torque profile in a joint movement therapy and assistive device system, the method comprising steps of:

selectively securing a pin of a proximal end of a first tensioning component of a plurality of tensioning components to a first connecting component of a torque profile device and a distal end of the tensioning component to a connecting device of at least one segment end, the torque profile device having a plurality of connecting components, the plurality of connecting components disposed around a center of the torque profile device, forming a pattern of rings of the connecting components; and selectively securing a pin of a proximal end of a second tensioning component of a plurality of tensioning components to a second connecting component of the torque profile device and a distal end of the tensioning component to the connecting device of the at least one segment end, the first and second tensioning components in a parallel and stacked arrangement relative to each other.

22. The method of claim 21, wherein the at least one segment end is a first segment end, and further comprising selectively securing a proximal end of a third tensioning component of the plurality of tensioning components to a third connecting component of the torque profile device and a distal end of the third tensioning component to a connecting component of a second segment end.

23. The method of claim 21, wherein the at least one segment end is a first segment end, and further comprising selectively securing a proximal end of a third tensioning component of the plurality of tensioning components to a connecting component of a second segment end and a distal end of the third tensioning component to the connecting device of the first segment end.

24. The method of claim 21, wherein the step of selectively securing a proximal end of a tensioning component of a plurality of tensioning components to a connecting component of a torque profile device and a distal end of the tensioning component to a connecting device of at least one segment end comprises selectively securing a pin of the proximal end of the tensioning component to a hole of the torque profile device and a pin of the distal end of the tensioning component to the connecting device of the at least one segment end.

25. The method of claim 21, wherein the step of selectively securing a proximal end of another tensioning component of the plurality of tensioning components to another connecting component of the torque profile device and a distal end of the tensioning component to the connecting device of the at least one segment end comprises selectively securing a pin of the distal end of the tensioning component to the connecting device of the at least one segment end.

* * * * *